United States Patent Office 3,510,506
Patented May 5, 1970

3,510,506
BORATE ESTERS OF N-PANTOYL-HYDROCARBON AMINES
Elbert E. Harris, Westfield, and Stuart Weber, Colonia, N.J., assignors to Merck & Co. Inc., Rahway, N.J., a corporation of New Jersey
No Drawing. Filed Apr. 22, 1966, Ser. No. 544,392
Int. Cl. C07f 5/04
U.S. Cl. 260—462                                  4 Claims

ABSTRACT OF THE DISCLOSURE

Novel racemic and d and l borate esters of N-substituted pantoyl hydrocarbon amines prepared by reacting boric acid and a N-substituted pantoyl hydrocarbon amine and resolving the formed racemic cyclic borate ester derivatives by preferential precipitation and crystallization. The borate esters are useful in preparing laevorotatory pantolactone which in turn may be converted to pantothenic acid.

---

This invention relates generally to improvements in methods of separating stereoisomeric organic chemical substances. More particularly, it relates to the resolution of racemic 2 - hydroxy - 3,3 - dimethylbutyrolactone into its optically active isomers. It is concerned also with the preparation of new compounds which can be easily resolved into their enantiomorphic forms.

The processes and intermediates of this invention are useful in synthesizing growth promoting substances having the physiological activity of pantothenic acid. Pantothenic acid is a member of the B complex vitamins and is used to treat vitamin B deficiency diseases.

In accordance with one method for preparing pantothenic acid or its derivatives possessing similar physiological activity, β-alanine or a compound capable of yielding β-alanine is condensed with 2 - hydroxy - 3,3 - dimethylbutyrolactone, hereinafter referred to as "pantolactone" or a chemical equivalent thereof. In this condensation, the laevorotatory form of pantolactone must be used because if d-pantolactone is used, the condensation product does not possess the desired physiological activity. Hence, resolution of the racemic pantolactone is essential before condensation if satisfactory yields of the desired product are to be obtained.

Various methods have been developed for the separation of racemic pantolactone into its stereoisomers. Thus, resolution has been achieved according to one method by treating the racemic pantolactone with optically active alkaloid bases such as brucine or quinine to form the corresponding acid-alkaloid stereoisomers and separating the acid-alkaloid stereoisomers with preferential solvents. This method, along with various other methods known in the art, is quite expensive and economically undesirable. Hence, simple and economical methods of separating l-pantolactone from racemic mixtures thereof have been sought in the art.

It is an object of this invention to provide an improved method for the separation of stereoisomeric organic chemical substances. Another object of this invention is to provide a method for the preparation of new racemic and dextrorotatory cyclic borate ester derivatives of N-pantoylhydrocarbon amines. A further object of this invention is to provide an improved method for resolving stereoisomeric cyclic borate ester derivatives of N-pantoyl hydrocarbon amines. A still further object of this invention is to provide an improved method for the preparation of laevorotatory pantolactone which comprises separating cyclic borate ester derivatives of N-pantoyl hydrocarbon amines into their enantiomorphic forms and then converting the dextrorotatory cyclic boric ester derivative of these amines to the desired laevorotatory pantolactone. Other objects will become apparent from the detailed description of the invention hereinafter provided.

In accordance with the present invention, racemic cyclic borate ester derivatives of N-pantoyl hydrocarbon amines, which are prepared by the reaction of boric acid with the particular N-pantoyl hydrocarbon amine, are spontaneously resolved into their enantiomorphic forms by dissolving the said cyclic borate ester derivatives in organic solvents and then separating the enantiomorphic forms by preferential precipitation and crystallization. The separated dextrorotatory cyclic borate ester derivative of the N-pantoyl hydrocarbon amine can then be converted to the desired laevorotatory pantolactone by an acidic hydrolysis. In referring to the N-pantoyl hydrocarbon amine described above, the term "pantoyl" is used for the 2,4-dihydroxy-3,3-dimethyl butyryl radical.

It has been found that the cyclic borate ester derivatives of N-pantoyl hydrocarbon amines can be prepared by reacting N-pantoyl hydrocarbon amine with boric acid in a suitable organic solvent such as acetone, benzene or the like. This reaction is usually carried out at room temperature although it can be carried out at temperatures from room temperature to the reflux temperature of the particular solvent used. The reaction is carried out for a sufficient time to complete the formation of the cyclic borate ester derivative and once formed the cyclic borate ester derivative can be isolated from the reaction mixture by procedures known in the art. The reaction can be represented by the following equation:

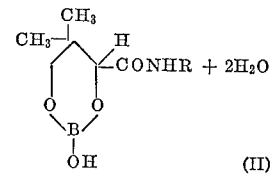

wherein R represents an alkyl group or an aryl group. The N-pantoyl(alkyl or aryl)amines (I) can be prepared according to procedures known in the art. It should, of course, be understood that the theoretical explanations for the possible structure of the cyclic borate ester derivatives of N-pantoyl (alkyl or aryl)amines, shown by Formula II above, are based on present knowledge of these products and does not exclude the possibility that future data will establish the structure to be different. Although any N-pantoyl(alkyl or aryl)amine (I) can be used to prepared the corresponding cyclic borate ester derivative, it is preferable to use those N-pantoylalkylamines wherein the alkyl group contains from 1 to 7 carbon atoms and those N-pantoylarylamines wherein the aryl group is phenyl. In particular, it has been found that optimum resolution can be obtained with cyclic borate esters of such N-pantoyl alkylamines as N-pantoylmethylamine, N-pantoylisopropylamine and N-pantoyl-sec-butylamine.

In accordance with this invention, it has been discovered that a racemic cyclic borate ester of an N-pantoylalkyl (or aryl) amine may be spontaneously resolved into its enantiomorphic forms by dissolving the racemate in a suitable organic solvent, and seeding said solution with crystals of one enantiomorph, whereby the enantiomorph corresponding to the seed crystallizes, and the other enantiomorph remains dissolved in the organic solvent. In this way an essentially complete resolution is achieved, one isomer crystallizing or precipitating to the substantial exclusion of the other. It is important, however, that the organic solvent medium be one in which the racemic mixture is capable of becoming supersaturated, and that one optical isomer of the cyclic borate ester is capable of precipitating or crystallizing from the solution to the substantial exclusion of the other isomer when such crystallization is initiated by such devices as seeding. Preferably, the solvent selected should be one in which solubility of the cyclic borate ester therein is to some degree temperature-dependent so that the desired isomer is also encouraged to crystallize from the solution upon a change in temperature of the solution of the racemates. Solvents that might be mentioned as suitable for use in the process of the invention are ethyl acetate, acetonitrile and tetrahydrofuran.

Thus, for example, when the racemic cyclic borate ester of an N-pantoylalkyl (or aryl) amine is dissolved in an organic solvent as described above to form a supersaturated solution, the mixture is seeded with a small amount of crystalline dextrorotatory isomer of the same cyclic borate ester. A spontaneous resolution occurs, and the dextrorotatory isomer crystallizes from solution with the laevorotatory isomer remaining dissolved. The dextrorotatory cyclic borate ester derivative which crystallizes can be isolated by filtration and reconverted in high yield to the optically active laevorotatory pantolactone by an acidic hydrolysis such as by treating the dextrorotatory cyclic borate ester with an aqueous inorganic acid, such as with aqueous sulfuric acid or aqueous hydrochloric acid. This lactone is used to prepare the biologically active d-pantothenic acid. In order to utilize the laevorotatory cyclic borate ester, the majority of which is still in solution after the dextrorotatory cyclic borate ester is separated, said solution is seeded with crystals of the corresponding laevorotatory cyclic borate ester thus causing the laevorotatory enantiomorph to precipitate. The dextrorotatory pantolactone is obtained by an acid hydrolysis as described above, and the resulting d-pantolactone may then be racemized by known methods to the racemic pantolactone, which in turn can be converted to a racemic cyclic borate ester and the resolution process of this invention repeated.

It will, of course, be understood that the invention embraces the process wherein the initial solution is first seeded with laevorotatory borate ester to preferentially crystallize that enantiomorph.

In a particular embodiment of our invention, the racemic cyclic borate ester of N-pantoylmethylamine is dissolved in ethyl acetate and the solution seeded with a small amount of dextrorotatory cyclic borate ester of N-pantoylmethylamine which causes the dextrorotatory cyclic borate ester of N-pantoylmethylamine to crystallize from the cooled solution. The precipitated isomer is isolated by filtration, and this product is then converted to l-pantolactone by hydrolysis in aqueous sulfuric acid.

Following are particular examples which illustrate this invention. They are intended to be illustrations of the invention and not limitations thereof.

EXAMPLE 1

Preparation of the laevorotatory cyclic borate ester of N-pantoylmethylamine 25 grams of a racemic cyclic borate ester of N-pantoylmethylamine prepared as described below is dissolved in 160 ml. of ethyl acetate at 60° C. The saturated solution is allowed to cool to 40° C. and then seeded with about 3 mg. of pure dextrorotatory cyclic borate ester of N-pantoylmethylamine. Upon allowing the mixture to stand at about 35° C. for approximately one hour, the dextrorotatory cyclic borate ester of N-pantoylmethylamine precipitates. The desired d-isomer is then filtered from the solution. A sample of this material had a melting point of 118° C.–120° C. and an optical rotation, $[\alpha]_D$ of +33° C.

Similarly, the separation of the dextrorotatory cyclic borate ester of N-pantoylmethylamine from the racemic mixture thereof can be carried out using other solvents such as tetrahydrofuran or acetonitrile in place of ethyl acetate used above.

The racemic cyclic borate ester derivatives of other N-pantoylalkylamines such as the cyclic borate ester of N-pantoyl-n-propylamine, N-pantoylisopropylamine or N-pantoyl-sec-butylamine or the cyclic borate ester of N-pantoylphenylamine can be used in a manner similar to the manner in which the cyclic borate ester of N-pantoylmethylamine is used in the example above and the resolved and crystallized dextrorotatory cyclic borate ester of the particular N-pantoylalkyl (or phenyl) amine, then hydrolyzed as described below to yield the desired l-pantolactone without departure from the present invention.

The racemic cyclic borate ester of N-pantoylmethylamine is prepared as follows:

Gaseous methylamine is slowly passed through a solution of 13 g. of racemic pantolactone in 50 ml. of methanol. When the liberation of heat ceases, the solution is concentrated under reduced pressure and cooled in an ice bath. The resulting white crystals of N-pantoylmethylamine are then isolated from the solution by filtration. A 2.5 g. sample of the racemic N-pantoylmethylamine so produced is dissolved in 20 ml. of acetone containing 1 drop of sulfuric acid and 0.96 g. of boric acid. After standing for 1 hour at room temperature, the reaction mixture is concentrated under reduced pressure to an oil. The slow addition of ethyl ether, with stirring, results in the precipitation of the cyclic borate ester derivative of N-pantoylmethylamine in the form of white crystals melting at about 123° C.–126° C.

The pure dextrorotatory cyclic borate ester of N-pantoylmethylamine which is used as a seend can be obtained by performing a similar treatment as outlined above except that pure laevorotatory pantolactone should be used as the starting material. The pure dextrorotatory cyclic borate ester of N-pantoylmethylamine obtained in this manner has a melting point of 128° C.–131° C. and an $[\alpha]_D$ of +40.4° C. Pure laevorotatory cyclic borate ester is prepared in similar fashion from dextrorotatory pantolactone.

The cyclic borate esters of other N-pantoylalkyl (or alkyl) amines are obtained in similar fashion from pantolactone and the appropriate amine, and treatment of the resulting amide with boric acid.

EXAMPLE 2

Preparation of laevorotatory pantolactone 3 grams of the dextrorotatory cyclic borate ester of N-pantolymethylamine prepared as described in Example 1 is heated at reflux for one hour in 100 ml. of 30% aqueous sulfuric acid. The laevorotatory 2-hydroxy-3,3-dimethylbutyrolactone formed is extracted with 300 ml. of chloroform and the chloroform layer is then dried and concentrated under vacuum to an oil. The infrared spectrum of the concentrate is superimposable on that of pure 2-hydroxy-3,3-dimethylbutyrolactone. An assay of this material by optical rotation indicates a substantial recovery of the l-pantolactone.

Any departure from the above description which conforms to the present invention is intended to be included within the scope of the claims.

What is claimed is:
1. A cyclic borate ester of N-pantoyl-R-amine where R is phenyl or an alkyl group having from 1 to 7 carbon atoms.
2. A dextrorotatory isomer of claim 1.
3. A laevorotatory isomer of claim 1.
4. A product of claim 1 wherein R is an alkyl group having 1–4 carbon atoms.

References Cited

UNITED STATES PATENTS 3,044,998   7/1962   Emrick et al. _____ 260—462 X

OTHER REFERENCES

Organic Chemistry, I. L. Finar, vol. II, 2nd ed., 1959, pp. 60–61.

LEON ZITVER, Primary Examiner

L. DE CRESCENTE, Assistant Examiner

U.S. Cl. X.R.

260—343.6, 551, 999